United States Patent [19]

Nakagawa et al.

[11] Patent Number: 4,909,865
[45] Date of Patent: Mar. 20, 1990

[54] PROCESS FOR PRODUCING A FERROMAGNETIC METAL POWDER HAVING AN OXIDIZED COATING

[75] Inventors: Etsuo Nakagawa; Masaru Niwano; Tetsushi Yamamoto; Jiro I, all of Minamata, Japan

[73] Assignee: Chisso Corporation, Japan

[21] Appl. No.: 229,453

[22] Filed: Aug. 8, 1988

[30] Foreign Application Priority Data

Aug. 24, 1987 [JP] Japan .................. 62-209491

[51] Int. Cl.$^4$ ............................... C23C 8/10
[52] U.S. Cl. ..................... 148/287; 148/105
[58] Field of Search ................. 148/207, 105

[56] References Cited

U.S. PATENT DOCUMENTS

| | | | |
|---|---|---|---|
| 2,805,639 | 9/1957 | Martin | 118/18 |
| 3,874,092 | 4/1975 | Huttlin | 34/130 |
| 3,903,333 | 9/1975 | Shirley, Jr. et al. | 427/212 |
| 4,470,844 | 9/1984 | Rademachers | 148/105 |
| 4,608,093 | 8/1986 | Umemuna | 148/105 |

FOREIGN PATENT DOCUMENTS

| | | | |
|---|---|---|---|
| 2054998 | 10/1975 | Japan | 148/105 |
| 0170201 | 9/1984 | Japan | 148/105 |
| 2112702 | 5/1987 | Japan | 148/105 |

Primary Examiner—Sam Silverberg
Attorney, Agent, or Firm—Leydig, Voit & Mayer

[57] ABSTRACT

A process for producing a ferromagnetic metal powder composed mainly of iron and having an oxidized coating and a superior dispersibility is provided, which process comprises feeding granules of a ferromagnetic metal powder composed mainly of iron and impregnated with an organic solvent into a horizontal, cylindrical, rotating type reactor having scraping plates fixed onto the inner wall thereof in parallel to the generating line thereof, passing an oxygen-containing gas through the reactor while rotating the reactor and keeping the inside temperature thereof at 10° to 80° C. to vaporize off the solvent and dry the granules, and then continuously or stepwise raising the temperature of the resulting material on heating while passing an oxygen-containing gas through the inside of the reactor.

15 Claims, No Drawings

PROCESS FOR PRODUCING A FERROMAGNETIC METAL POWDER HAVING AN OXIDIZED COATING

BACKGROUND OF THE INVENTION

1. Field of the Invention

This invention relates to a treatment for stabilizing a ferromagnetic metal powder, and more particularly it relates to a treatment for stabilizing a ferromagnetic metal powder composed mainly of iron.

2. Descripton of the Related Art

In recent years, as a magnetic material for magnetic recording media such as audiotape, video tape, video disk, etc., ferromagnetic metal powder, particularly a ferromagnetic metal powder composed mainly of iron has been noted and used. Such a ferromagnetic metal powder is obtained by heat-reducing iron oxyhydroxide or iron oxide obtained by heat-dehydration of iron oxyhydroxide in a reducing gas, and as compared with conventional iron oxide magnetic materials, it has a higher coercive force (Hc) and a larger saturation magnetization ($\sigma$s) so that it is possible to achieve a higher density recording.

However, such a ferromagnetic metal powder used for magnetic recording media has a large specific surface area and is chemically very active; hence it has a drawback that when it is taken out, as it is, into the atmosphere, heat generation or ignition due to a rapid oxidation reaction occurs.

In order to overcome such a drawback, there has been proposed a process wherein a ferromagnetic metal powder is subjected to a stabilization treatment by contacting the metal powder with an oxygen-containing gas in a liquid phase or in a gas phase and gradually forming an oxidized coating on the surface of the particles of the metal powder (hereinafter such a gradual formation of an oxidized coating on the surface of the particles of the metal powder being referred to as "gradual oxidation"). For example, the so-called liquid phase gradual oxidation process wherein the powder is immersed in an organic solvent and subjected to oxidation treatment in a solution while an oxygen gas-containing inert gas is passed therethrough (Japanese patent application laid-open No. sho52-85054/1977) and the so-called gas phase gradual oxidation process wherein the powder is contacted with an oxygen-containing inert gas having the oxygen partial pressure therein adjusted to subject it to stabilization treatment (Japanese patent application laid-open No. sho48-79153/1973) have been proposed. However, since the former process is directed to a reaction in a liquid phase, it has the following drawback: in order to carry out a uniform gradual oxidation, the mass of the ferromagnetic metal powder should be ground into primary particles or secondary particles in an organic solvent, but the surface energy of the ferromagnetic metal powder is so high that the grinding contrarily forms an agglomerate, which is gradually oxidized as it is so that this has a bad influence upon the dispersibility of the ferromagnetic powder or the diffusion of oxygen dissolved in the organic solvent onto the surface layer of the ferromagnetic metal powder particles is insufficient; hence the oxidation reaction occurs nonuniformly to make the magnetic characteristics inferior. On the other hand, since the latter process is directed to a reaction in a gas phase, it has the following drawback: the activity of the ferromagnetic metal powder particles is so high that control of the oxidation reaction accompanied with heat generation is very difficult; hence this is liable to result in an nonuniform gradual oxidation, which is accompanied with reduction in the coercive force and also notable reduction in the saturation magnetization with the lapse of time.

In place of the above processes, a process has been proposed wherein contact of the ferromagnetic metal powder with an oxygen-containing gas is gradually changed from that in a liquid phase to that in a gas phase (Japanese patent application laid-open No. sho59-170201/1984). According to such a process, however, the reaction temperature is so high and the oxygen concentration in the oxygen-containing gas is also so high that the time of the oxidation reaction is very short; hence unevenness of the resulting oxidized coating due to nonuniform oxidation is liable and occur to result in deterioration in the coercive force so that when the resulting product is made up into a tape, the relative squareness (Rs) of the tape is notably reduced and also control of the saturation magnetization is very difficult.

SUMMARY OF THE INVENTION

The object of the present invention is to provide a process for producing a ferromagnetic metal powder composed mainly of iron having a uniform and dense oxidized coating on its surface and also having a superior dispersibility which process makes it possible to control the saturation magnetization after gradual oxidation; makes it possible to produce a ferromagnetic metal powder having small deterioration with the lapse of time; and is easy to control the oxidation reaction and hence is suitable for a commercially large scale production.

The present invention resides in a process for producing a ferromagnetic metal powder having an oxidized coating, which process comprises feeding granules of a ferromagnetic metal powder composed mainly of iron, having a minimum diameter of 0.25 to 10 mm and impregnated with an organic solvent into a horizontal, cylindrical, rotating type reactor having scrapers fixed onto the inner wall thereof in parallel to the generating line thereof, passing an oxygen-containing gas through said reactor while rotating said reactor and also while keeping the temperature inside said reactor at a range of 10° to 80° C. to thereby vaporize off said solvent and dry said granules, and thereafter successively continuously or stepwise raising the temperature of the resulting material on heating while passing an oxygen-containing gas through the inside of said reactor.

DETAILED DESCRIPTION OF PREFERRED EMBODIMENTS

The present invention is characterized in that since the granules of a ferromagnetic metal powder composed mainly of iron and impregnated with an organic solvent is dried at a relatively low temperature, the reaction heat generated by the oxidation reaction which occurs along with the drying is utilized as a latent heat of vaporization of the organic solvent, and a rapid rise in the temperature of the ferromagnetic metal powder is inhibited and hence its gradual oxidation proceeds very slowly so that it is possible to form a uniform and dense oxidized coating on the surface of the ferromagnetic powder particles. In such a reaction, agitation is very important, and agitation in the present invention is carried out by the scraper in the above-mentioned rotating type reactor so that there is a characteristic that only a mutual contact of granules of the ferromagnetic metal powder with one another occurs and hence pulverization of the granules is notably inhibited to afford a good quality. Further, since granules of a ferromagnetic metal powder are used as the raw material at the time of gradual oxidation, the location of the respective ferromagnetic powder particles is kept constant with one another from the start of the gradual oxidation to its completion so that the gradual oxidation is carried out in a state where no agglomeration of the particles occurs. This is also considered as a cause of the above uniform gradual oxidation.

The present invention is also characterized in that since the granules of a ferromagnetic metal powder composed mainly of iron and impregnated with an organic solvent are dried, followed by continuously or stepwise raising the temperature on heating while passing an oxygen-containing gas, diffusion of oxygen present on the oxidized coating layer into the surface layer of the powder particles and diffusion of metal atoms inside the layer are suitably promoted and active parts generated by such diffusions are successively and gradually oxidized so that a thick, uniform and dense coating grows gradually and a ferromagnetic metal powder having a small deterioration in the coercive force and saturation magnetization with the lapse of time and a good corrosion resistance even in the atmosphere is ultimately obtained. Further, the present invention is also characterized in that it is also possible to optionally control the value of the saturation magnetization depending on the final temperature at the time of raising the temperature on heating.

The process of the present invention is applicable to any kind of ferromagnetic metal powder composed mainly of iron and used for magnetic recording media. The ferromagnetic metal powder can be of iron, alone or iron containing at least one of metal components other than iron such as Ni, Si, Al, Mn, Cu, Cr, Ti, Mg, Co Zn, Ba, Sm, etc. and compounds of these metals in 50% by weight based on the weight of iron. Examples of the ferromagnetic metal powder are those obtained by reducing iron oxyoxide, hematite, maghematite, magnetite, etc. containing or not containing metal elements other than iron.

As to the ferromagnetic metal powder used in the present invention, it is preferred to make up the powder into granules having a minimum diameter of 0.25 mm or more, in order to prevent the powder from scattering off to the outside of the reactor system with the oxygen-containing gas. On the other hand, the granules are preferred to have a minimum diameter of 10 mm or less, in order to make uniform the oxidation of the ferromagnetic metal powder particles constituting the granules on the respective surfaces thereof.

The reaction temperature at the time of the above drying is in the range of 10° C. to 80° C., preferably 10° C. to 60° C. If it is lower than 10° C., the quantity of the organic solvent vaporized is so small that a long time is required for drying the granules; hence such low temperatures are uneconomical. If it exceeds 80° C., the vaporization of the organic solvent and the oxidation reaction are so rapidly promoted that it is difficult to control the reaction temperature and unevenness of the resulting oxidized coating occurs so that deterioration of magnetic characteristics is induced or a runaway oxidation reaction occurs; hence such high temperatures are also undesirable. The reaction time depends on the quantity of the organic solvent vaporized with the oxygen-containing gas, and the higher the reaction temperature, the shorter the time, while the larger the quantity of the oxygen-containing gas, the shorter the time, but a reaction time of 10 to 50 hours is preferred. If it is shorter than 10 hours, the reaction occurs too rapidly when the granules are dried so that there is a fear that deterioration of the magnetic characteristics occurs, while if the time exceeds 50 hours, such longer time is uneconomical.

The temperature-raising rate at the time of the above temperature elevation on heating is preferred to be in the range of 0.1° C. to 8° C. per hour, more preferably 0.3° C. to 2° C. If it is less than 0.1° C. per hour, diffusion of atoms inside the oxidized coating layer proceeds so slowly that a long time is required for forming a uniform and thick oxidized coating, while if it exceeds 8° C. per hour, diffusion of atoms is so rapidly promoted that unevenness of the resulting oxidized coating occurs, the magnetic characteristics deteriorate and temperature rise due to rapid heat generation occurs so that the whole of the powder is converted into iron oxide. The highest temperature which can be allowed to be attained by the temperature elevation at that time is preferably 140° C., more preferably 100° C. and most preferably 80° C. If the temperature is too high, the value of the saturation magnetization is too small; hence higher temperatures are not practical.

As to the oxygen-containing gas at the time of the above drying, any gas containing oxygen is usable, but an inert gas containing 0.1 to 7% by volume of oxygen is preferable, 0.5 to 5% by volume is more preferable. Since the higher the reaction temperature at the time of the drying, the higher the oxidation rate, it is necessary to suppress the reaction by reducing the oxygen concentration. If the content exceeds 7% by volume, it is difficult to control the oxidation reaction, and such higher content may be included within an explosive range in the case of using an organic solvent; hence the higher contents are undesirable in the aspect of safety. Further, the inert gas includes He, Ne, Ar, $CO_2$, $N_2$, etc., but usually, use of $N_2$ is cheap and practical.

Examples of the organic solvent used in the present invention are aromatic hydrocarbons such as benzene, toluene, xylene, etc., fluorine derivative solvents such as trifluoroethanol, perfluoroctane, etc., and lower alcohols such as methanol, ethanol, etc.

The oxygen concentration in the oxygen-containing gas at the time of the temperature elevation on heating is preferred to be in the range of 0.1 to 21% by volume. The upper limit of this concentration has no particular limitation, and a mixture of air with oxygen gas may be used, but in this case, 21% by volume or less is preferred since higher contents are uneconomical. If the concentration is lower than 0.1% by volume, the oxidation reaction is insufficient and in order to obtain an oxidized coating having a sufficient thickness, a long time is required; thus this is uneconomical.

The horizontal, cylindrical and rotating type reactor provided with scraping plates on the inner wall thereof in parallel to the generating line thereof, used in the present invention can be provided with a jacket on the outer periphery of the reactor for controlling the reaction temperature.

The present invention will be described in more detail by way of Examples, but it should not be construed to be limited thereto.

EXAMPLE 1

Granules (columnar shape, diameter 3 mm and length 6 mm) (15 kg) of a ferromagnetic powder composed mainly of iron and having magnetic characteristics of a coercive force (Hc) of 1,495 Oe, a saturation magnetization ($\sigma s$) of 154 emu/g and a relative squareness (Rs) of 0.509 were immersed in toluene (45 kg) and the resulting mixture was introduced into a horizontal, cylindrical and rotating type reactor (diameter 400 mm and length 1,200 mm) provided with 4 scraping plates (width 75 mm) on the inner wall thereof in parallel to the generating line thereof and directed toward the central line of the cylinder of the reactor, and also provided with a jacket for controlling the reaction temperature on the outer periphery of the reactor, and further provided with ventilating means for an oxygen-containing gas into or out of the reactor, followed by separating toluene by filtering and passing a mixed gas obtained by diluting air with $N_2$ and having an oxygen concentration of 1% by volume at a rate of 20 m³/hr., while keeping the inner temperature (the temperature of granules inside the reactor; this applies to the following) at 20° C. and with stirring at a number of revolutions of 1.0 rpm. Twenty two hours were required until the reactor was entirely free from toluene. The oxygen concentration in the mixed gas was then raised at a rate of 1% per hour, while the inner temperature was kept constant and after the concentration of oxygen reached 5%, reaction was carried out for 4 hours, followed by continuously raising the inner temperature at a rate of 1° C./hr, while keeping the oxygen concentration in the mixed gas at 5%. When the temperature reached 50° C., the reaction was stopped and granules of the magnetic powder were taken out into the atmosphere. The magnetic characteristics of the magnetic powder were as follows:

Hc: 1,510 Oe, $\sigma s$: 125 emu/g, Rs: 0.515.

The stability to oxidation of this magnetic powder was evaluated in terms of percentage reduction in $\sigma_s$ ($\Delta \sigma_s$) after it was allowed to stand for 3 days under conditions of 60° C. in air and 90% RH (evaluations in the following Examples were similarly carried out), and the value was 4.5%. Next, this ferromagnetic metal powder (55 g), a binder consisting of vinylchloride acetate resin and a polyurethane (12.4 g), a curing agent (0.7 g), an abradant (3.8 g), a dispersing agent (2.8 g) and a mixed solvent consisting of toluene, methyl ethyl ketone, methyl isobutyl ketone and cyclohexanone (171 g) were fed into a sand mill, followed by agitating these materials at 1,850 rpm for 2 hours to obtain a coating of magnetic material. This coating was coated onto a polyester film, followed by orienting the resulting material in a magnetic field of 3,000 G to prepare a tape, and measuring its static magnetic characteristics in an outside magnetic field of 5 kOe. The static magnetic characteristics of this tape were as follows:

Coercive force (Hc): 1,445 Oe, remanent induction (Br): 2,970 G and relative squareness (Rs): 0.84.

These magnetic characteristics, etc. are shown in Table 1.

EXAMPLE 2

The same ferromagnetic metal powder granules and apparatus as in Example 1 were used and treatment was carried out in the same manner as in Example 1 except that the inner temperature at the time of drying was 40° C. and 10 hours were required until toluene in the apparatus was entirely removed and that at that temperature, the oxygen concentration in the mixed gas was raised and 4 hours reaction was carried out. The resulting magnetic characteristics, etc. are shown in Table 1.

EXAMPLE 3

The same ferromagnetic metal powder granules and apparatus as in Example 1 were used and treatment was carried out in the same manner as in Example 1 except that the final temperature at the time of temperature raising was 60° C. The resulting magnetic characteristics, etc. are shown in Table 1.

EXAMPLE 4

The same ferromagnetic metal powder granules and apparatus as in Example 1 were used and treatment was carried out in the same manner as in Example 1 except that the oxygen concentration at the time of drying was 3% by volume. The magnetic characteristics, etc. are shown in Table 1.

COMPARATIVE EXAMPLE 1

The same ferromagnetic metal powder granules (5 kg) as in Example 1 were immersed in toluene (15 kg) and the resulting mixture was introduced into a mixer provided with agitating blades, a heating means and an organic solvent-recovering means, followed by keeping the inner temperature at 90° C., passing a mixed gas obtained by diluting air by $N_2$ and containing an oxygen concentration of 5% by volume at a rate of 1.2 m³/hr., while keeping the inner temperature at 90° C. and agitating the mixture at a number of revolutions of 6.0 rpm, to carry out reaction for 4.5 hours. The magnetic characteristics, etc. of the resulting ferromagnetic metal powder withdrawn are shown in Table 1.

COMPARATIVE EXAMPLE 2

After completion of the drying of the ferromagnetic metal powder granules in Example 1, a portion of the resulting material was taken out into the atmosphere without elevating the temperature on heating. The magnetic characteristics, etc. of the ferromagnetic metal powder are shown in Table 1. This powder had a particularly large $\Delta \sigma_s$ value.

As apparent from the magnetic characteristics, etc. of Examples and Comparative examples shown in Table 1, it is possible according to the process of the present invention to produce a ferromagnetic metal powder having a superior dispersibility, a small saturation magnetization value and a small deterioration on a commercial scale.

TABLE 1

| | Magnetic characteristics of ferromagnetic powder | | | | Statistic magnetic characteristics of tape | | |
|---|---|---|---|---|---|---|---|
| | Hc | $\sigma s$ | Rs | $\Delta \sigma s$ (%) | Hc | Br | Rs |
| Example 1 | 1510 | 125 | 0.515 | −4.5 | 1445 | 2970 | 0.84 |
| Example 2 | 1508 | 127 | 0.512 | −5.0 | 1442 | 2950 | 0.83 |
| Example 3 | 1508 | 120 | 0.515 | −2.5 | 1444 | 2930 | 0.84 |
| Example 4 | 1507 | 125 | 0.512 | −4.7 | 1442 | 1940 | 0.84 |
| Comp. ex. 1 | 1485 | 119 | 0.495 | −4.5 | 1420 | 2470 | 0.78 |
| Comp. ex. 2 | 1509 | 133 | 0.512 | −22.7 | 1443 | 3020 | 0.84 |

What we claim is:

1. A process for producing a ferromagnetic metal powder having an oxidized coating, which process comprises a feeding granules of a ferromagnetic metal powder composed mainly of iron, having a minimum diameter of 0.25 to 10 mm and impregnated with an organic solvent into a horizontal, cylindrical, rotating type reactor having scraping plates provided on the inner wall thereof in parallel to the generating line thereof, (b) passing an oxygen-containing gas through said reactor while rotating said reactor and also while keeping the temperature inside said reactor in a range of 10° C. to 80° C. to thereby vaporize said solvent and dry said granules and (c) thereafter raising the temperature of the resulting material on heating while passing an oxygen-containing gas through the inside of said reactor.

2. A process according to claim 1 wherein the temperature at the time of drying granules is in the range of 10° to 60° C.

3. A process according to claim 1 wherein the temperature-raising rate at the time of raising the temperature of the resulting material on heating is in the range of 0.1° C. to 8° C. per hour.

4. A process according to claim 1 wherein the highest temperature which is allowed to attain by raising the temperature of the resulting material on heating is 140° C.

5. A process according to claim 1 wherein said oxygen-containing gas is a mixed gas of air or oxygen gas with an inert gas as a diluting gas which is at least one member selected from the group consisting of nitrogen, carbon dioxide gas, helium, argon and neon.

6. A process according to claim 1 wherein the oxygen concentration of said oxygen-containing gas at the time of said drying is in the range of 0.1 to 7% by volume based on said oxygen-containing gas.

7. A process according to claim 1 wherein the oxygen concentration of said oxygen-containing gas at the time of raising the temperature of the resulting material on heating is in the range of 0.1 to 21% by volume based on said oxygen-containing gas.

8. A process according to claim 1 wherein after removal of solvent and drying said granules the temperature of the resulting material is raised continuously in step (c).

9. A process according to claim 1 wherein after removal of solvent and drying said granules the temperature of the resulting material is raised stepwise in step (c).

10. A process according to claim 1 wherein said organic solvent is an aromatic hydrocarbon, fluorine-containing solvent or lower alcohol.

11. A process according to claim 1 wherein said organic solvent is benzene, toluene or xylene.

12. A process according to claim 1 wherein said organic solvent is trifluoroethanol or perfluorooctane.

13. A process according to claim 1 wherein said organic solvent is methanol or ethanol.

14. A process according to claim 1 wherein the temperature within the reactor during the final heating step (c) is not greater than 100° C.

15. A process according to claim 1 wherein the temperature within the reactor during the final heating step (c) is not greater than 80° C.

* * * * *